United States Patent
Welch, Jr. et al.

(10) Patent No.: US 6,586,048 B2
(45) Date of Patent: Jul. 1, 2003

(54) METHOD FOR DEPOSITING A BARRIER COATING ON A POLYMERIC SUBSTRATE AND COMPOSITION COMPRISING SAID BARRIER COATING

(75) Inventors: Ronald F. Welch, Jr., Oak Ridge, NY (US); Robert J. Saccomanno, Montville, NJ (US); Gary A. West, Budd Lake, NJ (US)

(73) Assignee: Honeywell International Inc., Morristown, NJ (US)

( * ) Notice: Subject to any disclaimer, the term of this patent is extended or adjusted under 35 U.S.C. 154(b) by 70 days.

(21) Appl. No.: 09/828,065

(22) Filed: Apr. 5, 2001

(65) Prior Publication Data

US 2002/0182392 A1 Dec. 5, 2002

(51) Int. Cl.$^7$ ................................................ C23C 14/06
(52) U.S. Cl. .................... 427/255.6; 427/255.7; 427/322; 427/384
(58) Field of Search ............................ 427/255.6, 255.7, 427/322, 384

(56) References Cited

U.S. PATENT DOCUMENTS

| | | | |
|---|---|---|---|
| 3,342,754 A | 9/1967 | Gorham | 260/2 |
| 5,075,174 A | * 12/1991 | Pyle | 277/652 |
| 5,162,148 A | 11/1992 | Boye et al. | 428/287 |
| 5,221,572 A | 6/1993 | Meunier | 428/231 |
| 5,677,007 A | 10/1997 | Tsai | 427/412.1 |
| 5,879,808 A | * 3/1999 | Wary et al. | 428/411.1 |
| 5,998,691 A | 12/1999 | Abel et al. | 588/200 |
| 6,129,360 A | 10/2000 | Walker et al. | 277/592 |
| 6,165,566 A | 12/2000 | Tropsha | 427/536 |

FOREIGN PATENT DOCUMENTS

JP       04-173848       * 6/1992

* cited by examiner

Primary Examiner—Timothy Meeks

(57) ABSTRACT

The present invention relates to a method for depositing a parylene polymer barrier coating on a polymeric substrate for improving the chemical resistance of the substrate. The method comprises the steps of thoroughly treating a surface portion of the substrate to remove any contaminants, depositing at least one layer of parylene polymer on the contaminant-free surface portion via chemical vapor deposition, and then annealing each of the at least one layer of parylene polymer for a sufficient time. The present invention also relates to a composition for a barrier coating on a polymeric substrate comprising at least one layer of parylene polymer bonded to the surface of the polymeric substrate. The substrate can be a silicone rubber keypad.

12 Claims, 4 Drawing Sheets

PARYLENE CVD REACTOR

PARYLENE CVD REACTOR

METHOD FOR DEPOSITING A BARRIER COATING ON A POLYMERIC SUBSTRATE AND COMPOSITION COMPRISING SAID BARRIER COATING

FIELD OF THE INVENTION

The present invention relates generally to a method and composition for improving chemical resistance of a polymeric substrate, and more particularly to a barrier coating composition and method for depositing such coating composition onto a polymeric substrate formed into, for example, a keypad for providing an effective barrier against chemical attacks and other environmental effects.

BACKGROUND OF THE INVENTION

Elastic polymeric materials are used in a variety of applications where elasticity and spring properties are desired, such as touch keypads, for example, for computers and other devices. Keypads composed of such elastic materials are useful for environmentally sealing a keyboard or data input device to protect internal electronic components from external factors such as weather, moisture, dust, contaminants, and the like. Such keypads typically consist of an injection molded overlay that covers the keyboard circuit card. The overlay contains the individual keys with a conductive contact on the backside to activate the circuit card input. The flexible portion of the key is molded into the keypad and provides the spring constant for the key return. The edges of the keypad are sealed against the keyboard enclosure to produce an environmentally sealed keyboard assembly. Portions of the keypad may be translucent to permit backlighting of the alphanumeric key labels.

An elastic polymeric material useful for such purpose is silicone rubber which possesses excellent resistance to oxidation, ozone, water, and weather. However, solvents including alcohols and the like, corrosive substances, fuels including gasoline, diesel, jet fuel and the like, and nuclear, chemical, and biological warfare decontaminating agents, and the like, are rapidly absorbed into the silicone rubber material causing swelling, physical degradation, and loss of strength and integrity.

Therefore, in light of the above concerns, there is a need to protect elastic polymeric materials including silicone rubber against chemical and other environmental attacks, in order to preserve its physical integrity and extend the life of such materials beyond the typical expectancy and usefulness.

SUMMARY OF THE INVENTION

One object of the invention is to impart improved chemical resistance against solvents including alcohols and the like, corrosive substances, fuels including gasoline, diesel fuel, and the like, to elastic polymeric materials such as silicone rubber which have been less than fully satisfactory in resisting chemical attacks, particularly those induced by nuclear, chemical, and biological warfare decontamination agents.

Another object of the invention is to provide a barrier coating composition and method for applying such a composition to a polymeric substrate in a cost efficient and effective manner with no adverse effect on the underlying substrate.

With these and other objects in mind, the present invention relates generally to a barrier coating composition and a method for depositing the barrier coating composition on a polymeric substrate. Preferably, the barrier coating composition advantageously provides significantly improved chemical resistance for the coated substrate. In addition, the coating composition possesses excellent coating adhesion, mechanical strength, and barrier qualities required for long term durability and effective use. The composition and method of the present invention provides low-cost, effective protection of the polymeric substrate. In one embodiment of the invention, the substrate is a silicone rubber keypad.

The barrier coating preferably comprises at least one layer of one or more parylene polymers applied to an outer surface portion of the substrate. The composition is readily applied to the substrate surface portion by first treating the surface of the substrate to remove any contaminants, and depositing at least one layer of a parylene polymer through the process of chemical vapor deposition. The method may be advantageously carried out at room temperature, thus reducing any potential undesirable effects on the polymeric substrate due to heat. In addition, the method yields a highly conformal and continuously uniform coating even on corner portions of the substrate. Optionally, multiple layers of parylene polymers, or one layer thereof, can be annealed for improved barrier performance.

The at least one layer of a parylene polymer comprised in the barrier coating further includes a layer of parylene N, or a layer of parylene C. In a preferred embodiment, a first layer of parylene N is provided, followed by a second layer of parylene C in adjacent contact with the first layer. More preferably, there is further provided a graded interlayer comprised of a transitional mixture of parylene N and parylene C between the first and second layers of parylene N and parylene C, respectively.

In one aspect of the invention, there is provided a method for depositing a barrier coating on a polymeric substrate, which method comprises the steps of treating a surface portion of the polymeric substrate to remove any contaminants; depositing at least one layer of a parylene polymer on the surface portion of the polymeric substrate via chemical vapor deposition; and annealing by heat each layer of the parylene polymer in the presence of a vacuum at an annealing temperature for a sufficient time period.

In another aspect of the invention, there is provided a composition for a barrier coating on a polymeric substrate, which composition comprises a first layer including parylene N on the surface portion of the substrate; and a second layer including parylene C on the first layer of parylene N.

In a particular aspect of the invention, there is provided a method for depositing a barrier coating on a polymeric substrate including a silicone rubber keypad.

DESCRIPTION OF THE INVENTION AND PREFERRED EMBODIMENTS

Figure 1:
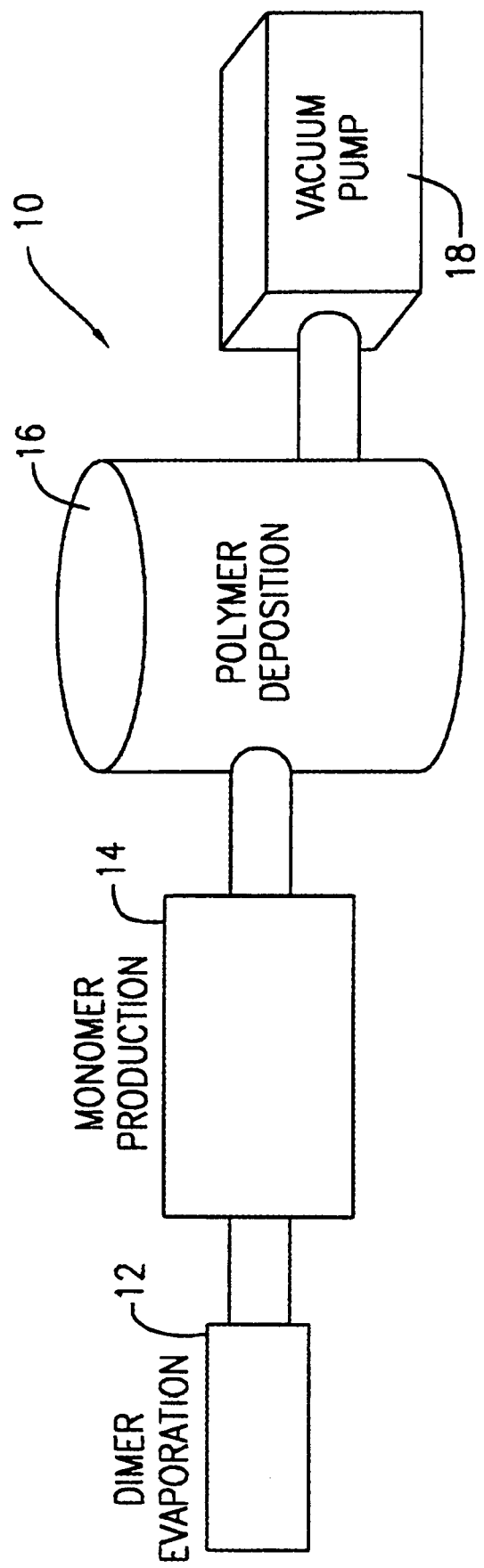
FIG. 1 is a schematic diagram of a parylene polymer chemical vapor deposition reactor system.

The present invention is generally directed to a barrier coating composition and to a method for depositing such a coating composition to a polymeric substrate for improving chemical resistance to substances including solvents such as alcohols and the like, fuels including gasoline, jet fuel, diesel fuel, and the like, nuclear, chemical, and biological warfare decontamination agents, and other corrosive substances. The present invention advantageously provides improved wear resistance, better durability, and resistance to chemicals as compared to uncoated polymeric substrates. The barrier coating composition is deposited on the polymeric substrates using a cost effective and efficient process which is suitable for broad use in a variety of applications and products including silicone rubber keypads and the like. A variety of substrates can be coated with a barrier coating utilizing the composition and method of the present invention.

The method and composition of the present invention are particularly suited in yielding a barrier coating that provides improved chemical resistance of the coated substrate to nuclear, chemical, and biological warfare decontamination agents. Such agents are especially corrosive and damaging to elastic polymeric materials including silicone rubber, and include, among others, DS2® decontaminate solution comprised of 70 percent weight of diethylene triamine, 28 percent weight 2-methoxyethanol, and 2 percent weight sodium hydroxide, and Super Tropical Bleach® (STB) comprised of an aqueous solution of calcium hypochlorite and calcium oxide.

The damaging chemical substances delineated above, typically attack the polymeric material (i.e. silicone rubber) by rapidly penetrating the material and causing swelling and possibly chemical changes. The penetration by the chemical substances induces the material to expand to nearly twice its original volume, and generally results in loss of structural strength and integrity. The saturated material eventually becomes especially prone to physical disintegration and failure. Accordingly, the method and composition of the present invention advantageously provide barrier protection for the underlying coated polymeric material to prevent chemical attacks and minimize the deleterious effects caused by such damaging chemical substances. This barrier protection desirably extends the polymeric material's functionality and life.

Accordingly, in light of the benefits provided by the present invention, the method and composition may be used in combination with a range of products, particularly those composed of polymeric material which would gain from the benefits of having a barrier set between the underlying polymeric material product and the external elements. Such benefits include increasing overall effective life of the product, providing excellent physical and chemical barrier protection, reducing surface adherence of foreign external elements, forming a barrier to reduce or prevent allergic reactions, improving wear and durability, and others as disclosed herein. The range of products may include, but is not limited to, keypads, conduits such as tubings and pipes, safety glass products, containers, implantable in vivo devices, taping strips, garments, electrical insulators, surgical gloves, prophylactic devices, and so forth.

In the described method and composition of the present invention, the polymeric substrate, which in one embodiment is a silicone rubber keypad, is thoroughly surface treated to remove any contaminants such as mold releasing agents, for example. A parylene polymer, also known as p-xylylene, is applied to surface of the polymeric substrate as a continuously uniform coating as will be described hereinafter. Optionally, the method further includes annealing the parylene polymer coating for further improving the chemical resistance and durability of the coating.

In the present invention, the parylene polymer has the following polymer repeat unit structure:

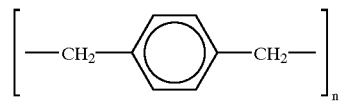

where "n" indicates the number of repeating units in the structure. The parylene polymer coating may be exemplified in three forms or variations, with each comprising varying degrees of chlorination. The three forms include parylene N as shown above with no chlorine atoms, parylene C which is produced from the same monomer as parylene N and modified by the substitution of a chlorine atom for one of the aromatic hydogens, and parylene D which is produced from the same monomer as parylene N and modified by the substitution of two chlorine atoms for two of the aromatic hydogens. We have discovered that parylene N possesses excellent adhesion properties to silicone rubber while exhibiting modest chemical barrier properties, and parylene C possesses excellent chemical barrier properties, but maintains lower adhesion to silicone rubber than parylene N. We have further devised an improved barrier coating which is created by first applying a first layer of parylene N to the surface of the polymeric substrate and then applying a second layer of parylene C overlaying the first layer. In one embodiment, a graded interlayer comprising a mixture of parylene N and parylene C is located between the first and second layers. Accordingly, a barrier coating possessing the desirable characteristics of both parylene polymers is achieved in a multilaminate configuration.

Preferably, the parylene polymer is applied through a coating process using chemical vapor deposition (CVD) techniques. The CVD process of applying a parylene polymer coating is described in U.S. Pat. No. 3,342,754, the disclosure of which is hereby incorporated by reference in its entirety to the extent that no conflict exists. The process utilizes a parylene dimer to produce the polymeric monomer in the vapor phase. The vaporous monomer is then polymerized on the surface of the substrate. In this process, cyclic dimer, di-p-xylylene, or substituted dimers are used as starting materials. The substituted dimers can be readily prepared from the di-p-xylylene by appropriate treatment of the substituted groups. Thus, halogenation, alkylation, acetylation, nitration, amination, cyanolation, and the methods for the introduction of such substituent groups as can normally be substituted on the aromatic nuclei, can be utilized.

The reactive diradicals are prepared by pyrolizing the di-p-xylylenes at a temperature less than about 700° C., preferably between 450° and 700° C. for a time sufficient to cleave substantially all of the di-p-xylylenes into vaporous parylene diradicals at a pressure such that the vapor pressure of the vaporous parylene diradicals is below 1.0 mm Hg., and cooling the vaporous diradicals to a temperature below 200° C. and below the ceiling condensation temperature of the parylene diradical. Condensation of the diradical yields a tough, linear, non-fluorescent polymer.

The CVD technique of depositing parylene polymer provides several advantages. The first is that the room temperature deposition process permits a wide range of substrates to be coated. The second is the formation of a highly conforming and uniformly continuous coating on substrates with complex shapes. The third is the capability to form very thin coating layers while remaining continuous and uniform for precise coating control.

The method and barrier coating composition of the present invention may be applied to a variety of elastic polymeric materials including, but not limited to, silicone rubber, ethylene propylene diene monomer (E.P.D.M.), neoprene, santroprene rubber, polychloroprene, nitrile butadiene rubber, polyurethane, polybutadiene rubber, natural rubber and the like.

With reference to FIG. 1, a schematic diagram of a parylene chemical vapor deposition reactor system 10 is shown. The system 10 comprises a vaporization chamber 12, a cracking chamber 14, a deposition chamber 16, and a vacuum pump 18. The vaporization chamber 12 heats a sample of the di-p-xylylene dimer at a temperature of about 175° C. The vaporized dimer proceeds to the cracking chamber 14 where the dimer is cracked to form parylene diradical, a monomer, at a temperature of about 680° C. The parylene diradical proceeds to the deposition chamber 16 where the diradical condenses on a cool surface of a polymeric substrate placed therein at room temperature. The vacuum pump 18 is connected to the system 10 to ensure that the process is carried out in a evacuated atmosphere for optimal processing.

Substrates comprised of elastic polymeric material such as silicone rubber, are typically formed by injection molding process. As a result, the surface of such substrates is tainted with a number of contaminants, including mold release agents, that must be removed prior to coating with parylene polymer. Accordingly, the surface of the substrate is preferably surface treated in preparation to applying a parylene polymer coating. The surface treatment method may comprise any process for treating a substrate surface which results in the removal of all or substantially all contaminants, dust particles and the like established thereon and/or results in the improvement of the adhesion of the parylene polymer on the surface of the substrate. Such surface treatment methods may include any cleaning procedure known to one of ordinary skill in the art compatible with the substrate material. Examples include solvent degreasing, detergent cleaning, plasma discharge and/or ultraviolet light surface treatments, thermal baking, mechanical agitation such as mildly abrasive cleaning methods, and the like.

In the alternative, the surface treatment method may include subjecting the surface of the substrate to a silating agent to provide adhesion promotion of the parylene polymer coating thereon. The silating agent would operate to modify the surface of the substrate prior to deposition of the parylene polymer coating. Such silating agents, as examples, may be selected from silating compounds, hexamethyldisilazane (HMDS), dimethyldimethoxysilane (DMMOS), trimethylchlorosilane (TMCS), trimethoxysilane, trichlorosilane, and the like. Alternatively, the substrate surface may be chlorinated prior to application of the parylene polymer coating for generating an increased polar surface which operates to yield a stronger molecular bond with the parylene polymer coating applied thereon.

In a preferred surface treatment method, a silicone rubber keypad is first thoroughly washed with a detergent solution, preferably a phosphate detergent solution (i.e., ALCONOX®) using an ultrasonic cleaner for at least an hour, to remove any contaminants present on the surface. The keypad is then rinsed with deionized water three times and rinsed under running deionized water for about 5 minutes. The rinsed keypad is then placed into a container of deionized water and ultrasonically cleaned for about 5 minutes. The keypad is then removed and shaken to eliminate any excess water, and placed into a container of methanol. The keypad is then ultrasonically cleaned in the methanol for about 5 minutes. The keypad is then removed, shaken to eliminate any excess methanol. Next, the keypad is placed into an oven at a temperature of about 80° C. for at least an hour. The dried keypad is removed from the oven and blown off with deionized nitrogen in preparation for parylene polymer coating. The above steps are typically carried out in a class 10,000 clean room.

We have further discovered that by annealing the deposited parylene polymer layer or layers in the coating at an elevated temperature for a sufficient time, a substantially improved chemically resistant parylene polymer barrier is formed. The term "annealing" as used herein refers to any process which operates to treat a substance with heat followed with cooling to improve the structural properties of the substance. The barrier properties of the parylene polymer coating are greatly improved after the annealing thermal treatment.

The annealing process is preferably conducted in the presence of a vacuum or inert gas such as helium, argon or nitrogen at atmospheric pressure. The optimal annealing conditions differ slightly between each variant of the parylene polymer. The optimal annealing temperature range is from about 100° C. to 220° C. for parylene N and from about 100° C. to 160° C. for parylene C. For composite multilaminate coatings of parylene N and parylene C, the optimal annealing temperature is about 120° C. This annealing process may be applied to a range of barrier coatings comprising various parylene polymer variants, in addition to parylene N and C. It is noted that the annealing process may be utilized on each parylene polymer layer individually as applied during the vapor deposition process, or on the parylene polymer coating as a whole upon applying all the parylene polymer layers.

The parylene polymer coating process of the present invention will now be described. The cleaned keypad is placed into the deposition chamber 16 and positioned for exposing the outer surface to the parylene monomer flow in the deposition chamber 16 during operation, as previously described. The deposition chamber 16 is sealed from ambient air and the atmosphere of the chamber 16 is evacuated with the vacuum pump 18. In an alternative embodiment of the present invention, the atmosphere in the deposition chamber 16 may be substituted with an inert gas such as helium, argon or nitrogen, at ambient pressure. The keypad remains in the chamber 16 for about 8 to 12 hours to allow any volatile materials to exit the keypad.

The CVD process is then initiated to produce a parylene polymer coating of sufficient thickness on the surface of the keypad. Preferably, the thickness of the parylene polymer coating is in the range from about 0.0001" to 0.001". The above deposition process may be repeated at least once using same or different parylene variants to produce a multilaminate parylene polymer coating on the surface of the keypad. The thickness of the deposited coating can be determined while in the deposition chamber 16 using any one of various optical methods known in the art, or the coating thickness can be determined after the article is removed from the deposition chamber 16.

In a more preferred embodiment of the invention, the silicone rubber keypad is first coated with parylene N, which bonds much more strongly with silicone rubber than parylene C, but is not as good a barrier material in terms of chemical resistance as parylene C to which it also bonds strongly with. The parylene N layer is then overlayed with a second layer of parylene C to overcome the reliability problem due to the weaker bonding of parylene C directly to the silicone rubber. The resulting multilaminate parylene barrier coating possesses the excellent chemical resistance of parylene C, with the superior adhesion properties of parylene N to silicone rubber for significant reduction of delamination. The preferred thickness of the parylene N layer is in the range of from about 0.0001" to 0.0005", more preferably about 0.0002". The preferred thickness of the parylene C layer is in the range of from about 0.0002" to 0.002", more preferably 0.0005".

In an alternate embodiment, the transition of the vapor supply from parylene N to parylene C in the deposition chamber 16, may be made gradually to form a parylene N to parylene C transitional interlayer located between the parylene N and parylene C layers. During the transition in the deposition chamber 16, the parylene N vapor flow is gradually reduced and the parylene C vapor flow is initiated and then increased in proportion to the corresponding reduction in parylene N vapor flow. This action produces a graded interface between the pure parylene N layer and the pure parylene C layer for improved adhesion therebetween. Preferably, the thickness of the interlayer is in the range of from about 0.00005" to 0.0005", more preferably 0.0001".

The coated keypad may then be annealed under vacuum in the deposition chamber 16 prior to its removal, or alternatively, in an evacuated oven (not shown). The keypad is then heated to a temperature of from about 80° C. to 220° C., preferably to a temperature of about 120° C., over a two hour period. The temperature is maintained for a period of from about 12 to 100 hours, preferably for about 48 hours. Upon completion of the annealing process, the keypad is cooled to room temperature and removed from the deposition chamber 16 or oven.

Figure 2:
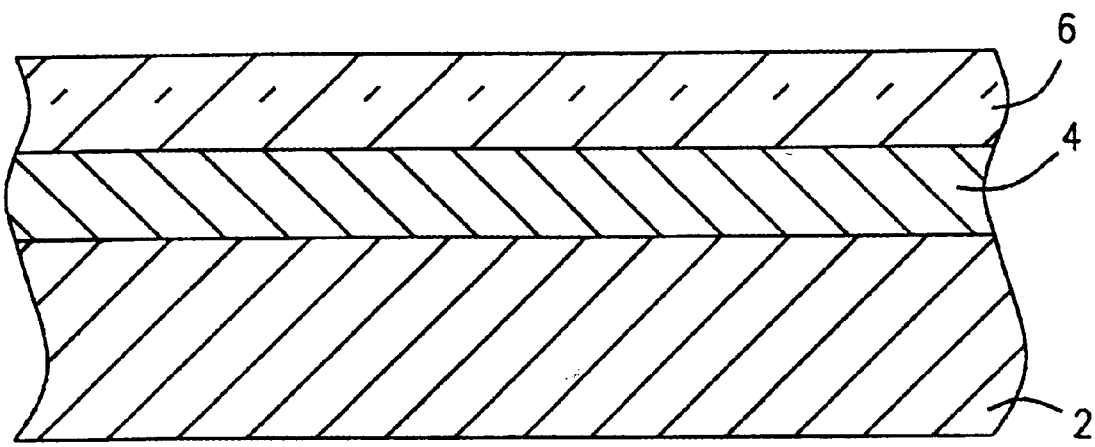
FIG. 2 is a cross sectional view of a polymeric substrate with multiple layers of parylene polymer covering the surface of the substrate.
Figure 3:
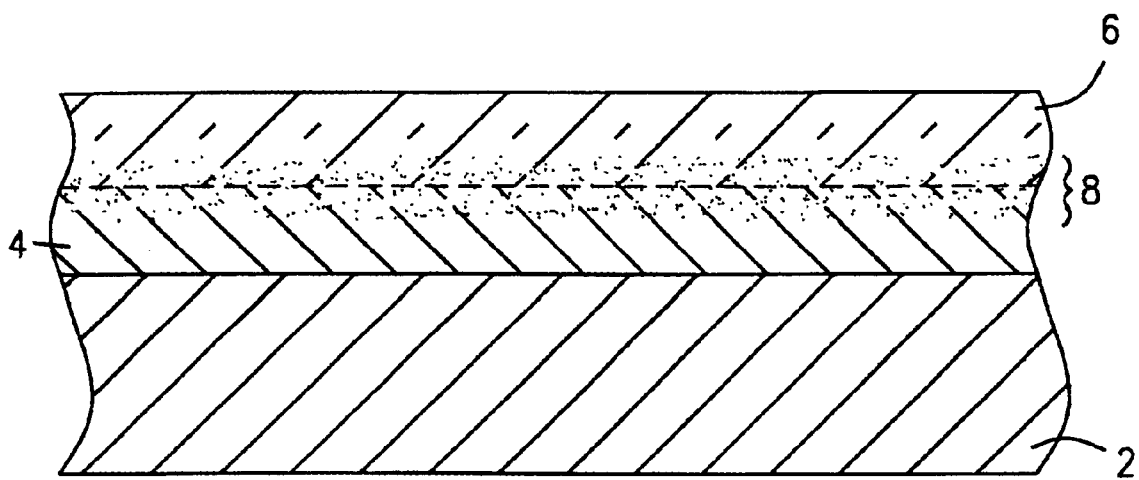
FIG. 3 is a cross sectional view of a polymeric substrate with multiple layers of parylene polymer including a graded interlayer, covering the surface of the substrate.

In FIG. 2, a substrate 2, such as that of a silicone keypad, is shown in cross section with the above-described laminate layers consisting of a parylene N bonding layer 4 and a top parylene C layer 6, the layers being deposited as described above. In FIG. 3, a transition layer 8 formed of parylene N and parylene C is located between the parylene N layer 4 and the parylene C layer 6, formed using the alternative coating method described above.

Although various embodiments and examples of the invention have been shown and described, they are not meant to be limiting, but merely as illustrating the presently preferred embodiment. Those of skill in the art may recognize various modifications to these embodiments, which modifications are meant to be covered by the spirit and scope of the appended claims. For example, the polymeric substrate may be other than that of silicone rubber, as previously discussed. The following examples are submitted for illustrative purposes only and are not intended to limit the scope of the invention as encompassed by the claims forming part of the application.

EXAMPLE 1

The barrier properties of a parylene polymer coating closely correlate to the degree of crystallization as determined by several deposition factors including the deposition temperature and the deposition rate. A post-deposition polymer annealing process provides a method for increasing the degree of parylene crystallization in the keypad coating for improved structural strength and resistance to chemical attacks.

Two sets of melting temperatures are reported in literature for parylene polymer coatings, both of which are listed below in Table 1.

TABLE 1

| | Parylene Melting Temperature | |
| --- | --- | --- |
| Parylene Type | Melting Temp. (° C.) | Melting Temp. (° C.) |
| N | 284 (Decomp.) | 420 |
| C | 140–160 | 290 |
| D | 170–195 | 380 |

It is believed that the higher listed temperatures indicate the crystalline melting points and the lower temperatures indicate melting points for the as-deposited coating.

Several parylene polymer coatings were applied to the surface of silicone rubber keypads by Paratronix, Inc., Attleboro, Mass. The keypad samples included uncoated keypads, unannealed coated keypads, and annealed coated keypads. Each of the latter was annealed in a high temperature vacuum furnace utilizing tungsten heating elements. The vacuum was maintained by a diffusion pump, which is typically in the $10^{-6}$ to $10^{-5}$ torr range. The keypad samples were pressed against the control thermocouple. The following keypad samples were annealed in the following manner:

Uncoated and parylene N-coated keypads were exposed to 140° C. temperature for 48 hours with a 2 hour heating ramp;

Uncoated and parylene N-coated keypads were exposed to 220° C. temperature for 48 hours with a 4 hour heating ramp;

Two parylene C coated keypads were exposed to 120° C. temperature for 90 hours with a 4 hour heating ramp; and Uncoated and parylene C-coated keypads were exposed to 140° C. temperature for 48 hours with a 2 hour heating ramp.

We have observed that fuels such as gasoline, jet fuel, and diesel fuels behave similarly. Of the group, gasoline is the most rapidly absorbed substance followed by jet fuel and diesel fuel. Each of the fuels attacks the silicone rubber material by saturating it to a point where the material nearly doubles in size and volume. At this saturation point, the structural strength of the material is diminished and the material is prone to disintegrating on contact. As the solvent evaporates from the material, the material returns to its original size or volume with some slight discoloration. There is also a slight weight loss due to the removal of remnant unpolymerized silicone rubber accompanied with compromised structural integrity. Accordingly based on this observation, gasoline was determined to be a feasible candidate for testing the effectiveness of annealed parylene polymer coatings versus nonannealed coatings, and in comparison to uncoated silicone rubber keypads.

Figure 4:
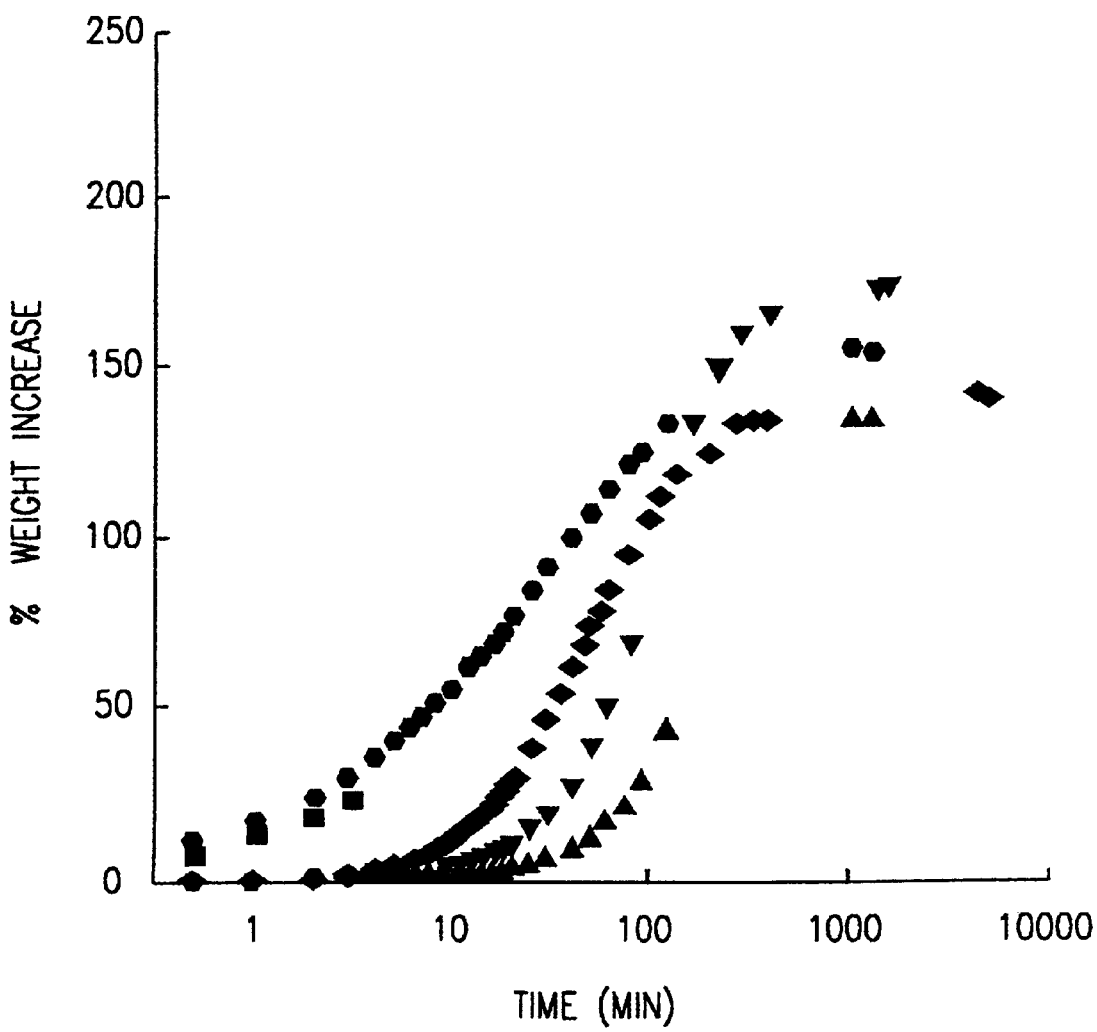
FIG. 4 is a graphical plot of the gasoline absorption rates versus exposure time for comparing keypad samples consisting of annealed and unannealed parylene N-coated ones, and uncoated ones.
Figure 5:
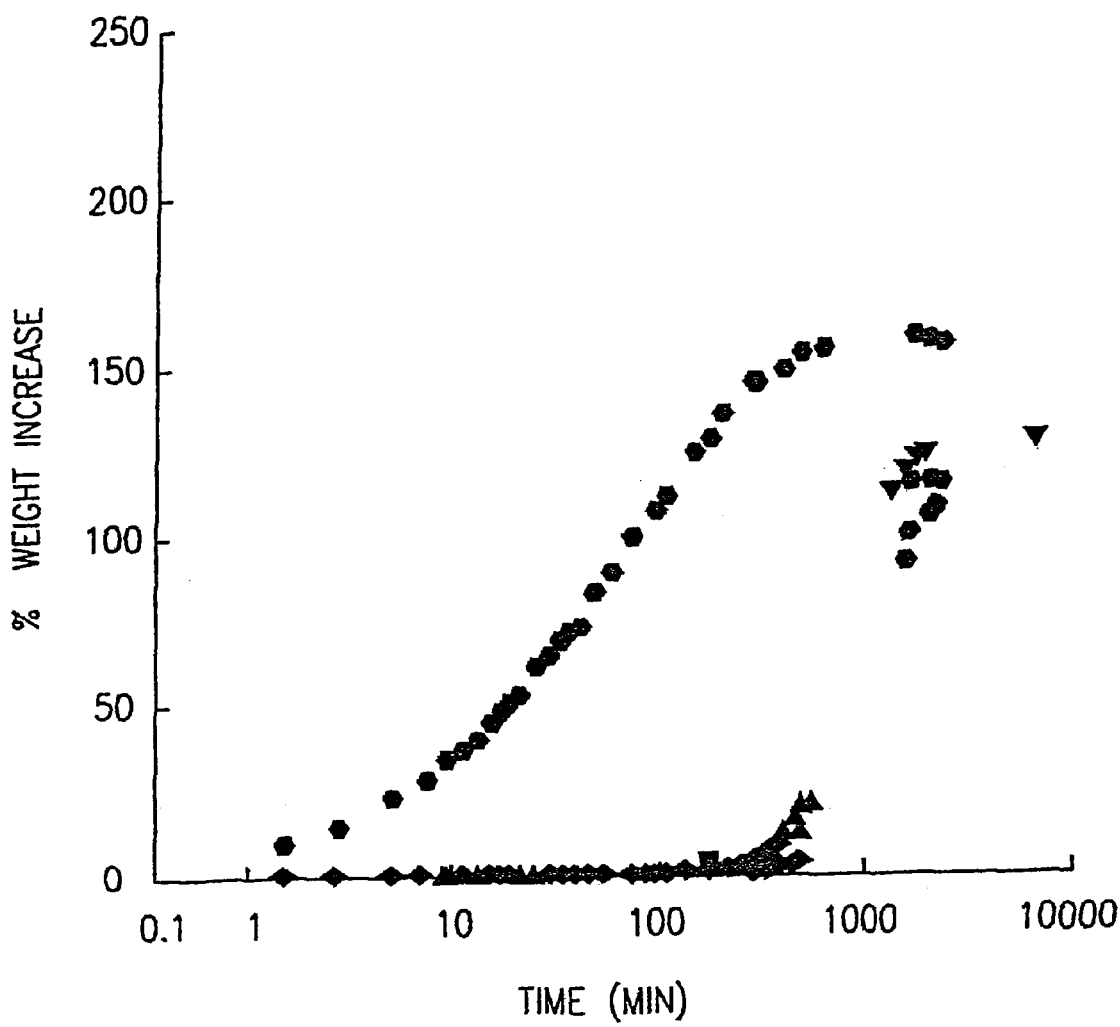
FIG. 5 is a graphical plot of the gasoline absorption rates versus exposure time for comparing keypad samples consisting of annealed and unannealed parylene C-coated ones, and uncoated ones.

Each of the keypad samples was immersed in gasoline and observed for gasoline absorption. Referring to FIGS. 4 and 5, graphical plots show gasoline absorption rates vs. exposure time for the keypad samples. A comparison of the initial gasoline absorption rates extrapolated from the plots of FIGS. 4 and 5 is shown in Table 2 below.

TABLE 2

Gasoline Absorption Rates for Annealed Parylene Polymer Coatings

| Anneal conditions | Initial Absorption Rate (%Δ Wt./min.) | | |
|---|---|---|---|
| | Parylene N | Parylene C | Uncoated |
| Un-annealed | 0.30 | 0.010 | 16 (4) |
| 120° C.; 90 hours, vac. | — | 0.004 (2) | — |
| 140° C.; 48 hours, vac. | 0.11 | 0.006 | 20 (2) |
| 220° C.; 48 hours, vac. | 0.39 | — | 14 |

()- indicate the number of measurements averaged.

The results showed that the barrier properties of the parylene N coatings were improved by annealing. The gasoline absorption rate was reduced by ⅓ after annealing at 140° C. for 48 hours, and there was no apparent loss of coating adhesion after expansion of the keypad in gasoline. Increasing the annealing temperature to 220° C. degraded the barrier properties somewhat below the initial gasoline absorption rate. It was also observed that full expansion of the keypad sample in gasoline resulted in visible cracking of the parylene polymer coating. The annealing temperature of 220° C. was also too high for the silicone keypad material, and the uncoated keypad sample became brittle at 220° C.

The barrier properties of the parylene C coatings were also improved by annealing. Annealing two keypad samples at 120° C. for 90 hours reduced the gasoline absorption rate at an average of about 2.5 times. Both coatings maintained their adhesion upon expansion of the keypad. During annealing at a high temperature of 140° C., there was some loss of coating adhesion at portions between several of the keys. This coating delamination may have affected the gasoline keypad absorption rate measurement, as reflected by the slightly elevated gasoline transmission rate reported in Table 2. No further loss of coating adhesion was detected with the sample after expansion of the keypad.

Accordingly, based on the results of this test, barrier properties of both the parylene N and C coatings were significantly improved by vacuum annealing the parylene polymer coated keypads.

EXAMPLE 2

The test described in the following examined the adhesive capacity of the parylene polymer coating to the surface of the polymeric substrate (i.e. silicone rubber keypad). The adhesive capacity is an important factor in measuring the effectiveness of the parylene polymer coating. The robustness of the coatings was determined by cycling one or more keys of a parylene polymer coated keypad. A test fixture was devised that included a reciprocating plunger member connected to a small motor.

The keypad sample was mounted on a flat aluminum backing plate, and the plunger depresses the key such that the conductive contact located on the backside of the key touches the backing plate. The frequency of the key cycling ranged from about 10 to 25 cycles per second. The total number of key cycles was counted and tallied with a photodiode detector assembly and a chopper wheel mounted on the motor shaft. The output from the photodiode detector is connected to a pulse counter to record the keyboard cycles.

The results of the test showed that parylene C was less adherent to silicone rubber than parylene N. Four keys on each of the keypad samples were cycled for $10^5$ cycles per key. There was no visible physical changes in the appearance of the keypad and no evidence of delamination of the parylene C coating. Four keys on parylene C keypads were cycled for about $10^6$ cycles per key. These samples showed some degree of wrinkling in the parylene polymer coating at the corner portions of the key in the skirt region where maximum flexing was observed. The cycled keypad samples were subjected to a gasoline immersion test to determine if any change in barrier properties may be observed due to varying degrees of cycling. The initial absorption rates extracted from the tests are compared in Table 3.

TABLE 3

| Number of Key Cycles (Parylene C coated keypads) | Initial Gasoline Absorption Rate (%Δ Wt./min) |
|---|---|
| No Cycling | 0.019 |
| $10^5$ Cycles | 0.027 |
| $10^6$ Cycles | 0.053 |

The results of this showed that flexing of the coating reduces the barrier protection of the parylene polymer coating as indicated above in Table 3, but this reduction correlated with the localized swelling of the keypad when exposed to gasoline. Swelling was first observed at the corner portions of the individual cycled keys at both the flexible skirt region and the key top areas where contact with the plunger is made. It was determined that the estimated lifetime of a parylene N coating is greater than $10^7$ key cycles, and the estimated parylene C lifetime was measured at about $10^6$ key cycles.

What is claimed is:

1. A method for depositing a barrier coating on a polymeric substrate, the method comprising the steps of:
    depositing a first layer of parylene N on a clean surface portion of the polymeric substrate;
    depositing a second layer of parylene C over said first layer; and
    annealing by heat each layer in the presence of a vacuum or an inert atmosphere at an annealing temperature for a time sufficient to increase the degree of parylene crystallization and to improve the adherence of the parylene C layer on the substrate and its barrier properties.

2. The method of claim 1, wherein the annealing temperature is from about 80 to 220° C. and the time period is from about 12 to 100 hours.

3. The method of claim 2, wherein the annealing temperature is about 120° C. and the time period is about 48 hours.

4. The method of claim 1, wherein the first layer of parylene N has a thickness in the range of from about 0.0001" to 0.0005", and the second layer of parylene C has a thickness in the range from about 0.0002" to 0.002".

5. The method of claim 4, wherein the first layer of parylene N is about 0.00002" thick and the second layer of parylene C is about 0.0005" thick.

6. The method of claim 1, further comprising the step of shifting gradually the deposition of parylene N to parylene C on the substrate to form a graded interlayer of parylene N and parylene C between the first and second layers.

7. The method of claim 6, wherein the graded interlayer includes a thickness in the range of from about 0.00005" to 0.0005".

8. A method for depositing a barrier coating on a polymeric substrate, the method comprising the steps of:
    treating a surface portion of the polymeric substrate to remove any contaminants, said treating step comprising:

cleaning ultrasonically the substrate in a solution of detergent, rinsing the substrate in deionized water, rinsing the substrate in methanol, drying the substrate in an oven at a temperature of about 80° C. for at least one hour, and blowing off the substrate with deionized nitrogen gas;

depositing at least one layer of a parylene polymer on the surface of the polymeric substrate via chemical vapor deposition; and annealing by heat each deposited layer of the parylene polymer in the presence of a vacuum at an annealing temperature for a time sufficient to increase the degree of parylene crystallization.

9. The method of claim 8, wherein said depositing step comprises depositing a first layer of parylene N on the surface of said substrate and a second layer of parylene C over said first layer of parylene N.

10. The method of claim 8, wherein said depositing step further comprises gradually shifting the deposition of parylene N to paralyne C so as to form a graded interlayer of parylene N and parylene C between the first and second layers.

11. A method for depositing a barrier coating on a clean elastomeric surface, the method comprising the steps of:

exposing the surface to parylene N in vapor phase to form a first layer of parylene N polymer;

shifting the exposure of said parylene N to parylene C in vapor phase upon reaching a desired thickness of the first layer to form a graded layer comprising a transitional mixture or parylene N and parylene C; and exposing the elastomeric surface to parylene C in vapor form in the absence of parylene N to form a third layer of parylene C polymer on said graded interlayer.

12. The method of claim 11, further comprising heating the resulting layers of parylene polymers to a temperature sufficient for annealing the parylene polymers in the presence of a vacuum; and maintaining the annealing temperature on the parylene polymer layers for a sufficient annealing time period to increase the degree of parylene crystallization and to improve the adherence capability of the parylene layers to the elastomeric surface.

* * * * *